United States Patent
Goft et al.

(10) Patent No.: US 6,490,586 B1
(45) Date of Patent: Dec. 3, 2002

(54) ORDERED SUB-GROUP MESSAGING IN A GROUP COMMUNICATIONS SYSTEM

(75) Inventors: Gera Goft, Karkur (IL); Shlomit Pinter, Haifa (IL); Esther Yeger Lotem, Mitzpe Aviv (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/472,681

(22) Filed: Dec. 27, 1999

(51) Int. Cl.$^7$ .............................................. G06F 17/30
(52) U.S. Cl. ........................................................ 707/10
(58) Field of Search ........................ 707/8, 10, 103 R, 707/104.1; 370/466; 709/227, 220, 204, 205

(56) References Cited

U.S. PATENT DOCUMENTS

| | | | |
|---|---|---|---|
| 5,748,958 A | 5/1998 | Badovinatz et al. | 709/100 |
| 6,317,438 B1 * | 11/2001 | Trebes, Jr. | 370/466 |
| 6,339,784 B1 * | 1/2002 | Morris et al. | 709/224 |

OTHER PUBLICATIONS

Jia, W. Zhou, W. Kaiser, Efficient algorithm for mobile multicast using anycast group –, J. Dept. of Comput. Sci., City Univ. of Hong Kong, China. This paper appears in: Communications, IEE Proceedings. On pp.: 14–18; Feb. 2001 vol.: 148 Issue: 1.*

G. Goft and E. Lotem, "The AS/400 Cluster Engine: A Case Study"; presented at the International Group Communications Conference IGCC 99; Aizu, Japan, 1999.

Hayden, "Maestro Open Toolkit: Group Member", taken from the "Ensemble Reference Manual"; Cornell University, 1997.

* cited by examiner

Primary Examiner—Diane D. Mizrahi
(74) Attorney, Agent, or Firm—Darby & Darby (57) ABSTRACT

A method for distributing messages among a group of member computing entities, which are mutually-linked in a distributed computing system. The members communicate in accordance with a communication protocol, which delivers a sequence of full-group multicast messages to all of the members in the group in an order that is uniform among all of the members. A sub-group is defined from among the members in the group, and a sub-group message is distributed to the members in the sub-group, such that the sub-group message is delivered to all of the sub-ground members in a uniform position with respect to the order of the full-group multicast messages, as well as with respect to other sub-group messages.

23 Claims, 5 Drawing Sheets

ORDERED SUB-GROUP MESSAGING IN A
GROUP COMMUNICATIONS SYSTEM

FIELD OF THE INVENTION

The present invention relates generally to distributed computing systems, and specifically to management of communications among computing entities in distributed computing applications.

BACKGROUND OF THE INVENTION

Computer clusters are widely used to enable high availability of computing resources, coupled with the possibility of horizontal growth, at reduced cost by comparison with collections of independent systems. Clustering is also useful in disaster recovery. A wide range of clustering solutions are currently available, including 390 Sysplex, RS/6000 SP, HACMP, PC Netfinity and AS/400 Cluster, all offered by IBM Corporation, as well as Tandem Himalaya, Hewlett-Packard Mission Critical Server, Compaq TruCluster, Microsoft MSCS, NCR LifeKeeper and Sun Microsystems Project Cascade. An AS/400 Cluster, for example, supports up to 128 computing nodes, connected via any Internet Protocol (IP) network. A developer of a software application can define and use groups of physical computing entities (such as computing nodes or other devices) or logical computing entities (such as files or processes) to run the application within the cluster environment. In the context of the present patent application and in the claims, such entities are also referred to as group members.

Distributed group communication systems (GCSs) enable applications to exchange messages reliably within a group of entities in a cluster. For example, the OS/400 operating system kernel for the above-mentioned S/400 Cluster includes a GCS in the form of middleware for use by cluster applications. This GCS is described in an article by Goft et al., entitled "The AS/400 Cluster Engine: A Case Study," presented at the International Group Communications Conference IGCC 99 (Aizu, Japan, 1999), which is incorporated herein by reference. The GCS allows messages to be multicast to all of the members of a group and assigns a uniform ordering to all of the broadcast messages. Failure to deliver a multicast message to one or more of the members, or even delivery out of order, can cause failures and bugs in software applications running in the cluster. To avoid such problems, the GCS ensures that if a multicast message is delivered to one of the group members, it will also be delivered to all other live and connected members of the group in the same order.

Other Group Communication Systems share this feature of uniform ordering of multicast messages among the group members. One example is "Ensemble," a GCS that was developed at Cornell University, as were its predecessors "ISIS" and "Horus." Ensemble is described in the "Ensemble Reference Manual," by Hayden (Cornell University, 1997), which is incorporated herein by reference. Another example is the IBM Phoenix system, described in U.S. Pat. No. 5,748,958, whose disclosure is likewise incorporated herein by reference.

Some of the names mentioned herein are trademarks of their respective owners.

SUMMARY OF THE INVENTION

It is an object of some aspects of the present invention to provide methods for convenient and reliable distribution of messages to sub-groups in a group computing environment.

It is a further object of some aspects of the present invention to provide GCS middleware offering ordered sub-group messaging capability.

In preferred embodiments of the present invention, a group communication system (GCS) for use in a group of computing entities allows a software application to define sub-groups that contain subsets of the members of the group. The GCS enables the application not only to convey multicast messages to all of the members of the group, but also to distribute sub-group messages to and among the sub-group members in a manner analogous to the distribution of the full-group multicast messages. The sub-group messages are uniformly ordered with respect to one another and to the full-group multicast messages.

The present invention thus overcomes a limitation of group communication systems known in the art, such as the above-mentioned AS/400 Cluster Engine and Ensemble, which enable developers of group computing applications to define multicast and point-to-point messages, but have no mechanism for handling sub-group messaging. In these existing systems, sub-group messages may be sent as multicast messages to all of the group members, but this method is wasteful of computing resources. Alternatively, point-to-point messages may be sent to all of the members who are identified as belonging to a given sub-group, but managing these messages at the application level is complicated and prone to error, particularly in terms of maintaining correct message ordering. Although it is theoretically also possible to define each sub-group as a new group, with its own message ordering, this solution raises the even more difficult problem of guaranteeing relative ordering between the messages in the new group and the original, larger group.

In some preferred embodiments of the present invention, the GCS is provided to the software application developer as a middleware package. The package preferably includes an application program interface (API), which enables sub-group messages to be defined simply and conveniently. Messages to be conveyed by the software application between group members are processed by a GCS protocol layer. This GCS layer interacts with lower network communication layers linking the members, such as IP (Internet Protocol) and UDP (User Datagram Protocol) layers, and assigns a uniform ordering to all multicast messages.

The GCS layer also includes a filter layer (or sub-layer), which receives a target list of sub-group members who are to receive each sub-group message and inserts an identification of the target sub-group in the message. Such sub-group messages are transmitted by the GCS using its normal, ordered multicast mechanism. When the sub-ground message reaches each of the members, the respective filter layer passes the message on to the member for processing only if the member is on the target list inserted in the message. In this manner, proper message ordering is maintained, both within the sub-group and with respect to general multicast messages. Meanwhile, the members who are not sub-group members, and are therefore not required to take any action on the sub-ground messages, are relieved of the overhead of processing them.

Although preferred embodiments described herein are based on a GCS, it will be appreciated that the principles of the present invention may similarly be implemented in substantially any distributed computing environment in which there is a mechanism for ordered conveyance of multicast messages in a computing group or cluster.

There is therefore provided, in accordance with a preferred embodiment of the present invention, a method for distributing messages among a group of member computing entities, which are mutually-linked in a distributed computing system and communicate in accordance with a communication protocol that delivers a sequence of full-group multicast messages to all of the members in the group in an order that is uniform among all of the members, the method including:

defining a sub-group from among the members in the group; and distributing a sub-group message to the members in the sub-group, such that the sub-group message is delivered to all of the sub-group members in a uniform position with respect to the order of the full-group multicast messages.

Preferably, the communication protocol includes group communication system middleware, to which the members of the group convey the full-group multicast messages to be delivered, and which assigns the uniform order to the full-group multicast messages.

Further preferably, distributing the sub-group message includes adding an identification of the sub-group to a corresponding one of the full-group multicast messages conveyed to the group communication system for delivery to all of the members of the group, and including filtering the corresponding full-group multicast message upon delivery to the members responsive to the identification of the sub-group. Most preferably, the sub-group message is included as a full-group multicast message in the uniform order assigned by the group communication system. Alternatively or additionally, filtering the corresponding full-group multicast messages includes, for each of the members, discarding the sub-group message if the member does not belong to the identified sub-group.

Preferably, the group communication system middleware includes a filter sub-layer, added to a group communication protocol layer, which adds the identification of the sub-group to the message when one of the group members sends the sub-group message and which filters the sub-group message upon its delivery to the group members. Most preferably, defining the sub-group includes receiving a target list of the sub-group members, and wherein adding the identification includes adding an indication of the target list to a header of the corresponding full-group multicast message.

Preferably, distributing the sub-group message includes distributing a plurality of sub-group messages, each having a respective, uniform position with respect to the order of the full-group multicast messages and with respect to the other sub-group messages. In a preferred embodiment, defining the sub-group includes defining multiple sub-groups within the group, such that at least some of the different ones of the plurality of sub-group messages are directed to different, respective sub-groups.

In another preferred embodiment, distributing the sub-group message includes delivering a full version of the message to the members of the sub-group and delivering a placeholder message to the members that are not in the sub-group so as to maintain the uniform position of the sub-group message with respect to the order of the full-group multicast messages.

In still another preferred embodiment, one of the group members is assigned to be a leader of the group, and distributing the sub-group message includes sending the message to the leader and receiving an order message from the leader, responsive to which the uniform position of the sub-group message is maintained with respect to the order of the full-group multicast messages.

There is also provided, in accordance with a preferred embodiment of the present invention, distributed computing apparatus, including:

a computer network; and a group of computer nodes, mutually-linked by the network using a communication protocol that delivers a sequence of full-group multicast messages to all of the nodes in the group in an order that is uniform among all of the nodes, wherein the protocol is configured to accept a definition of a sub-group of the nodes and to distribute a sub-group message to the nodes in the sub-ground, such that the sub-group message is delivered to all of the nodes in the sub-group in a uniform position with respect to the order of the full-group multicast messages.

In a preferred embodiment, a subnet of the computer network is defined corresponding to the definition of the sub-group.

There is further provided, in accordance with a preferred embodiment of the present invention, a computer software product for distributing messages among a group of member computing entities, which are mutually-linked in a distributed computing system, the product including a computer-readable medium in which computer program instructions are stored, which instructions, when read by the member computing entities, cause the entities to carry out a communication protocol such that a sequence of full-group multicast messages sent by one or more of the member entities are delivered to all of the members in the group in an order that is uniform among all of the members, and further enable an application running on at least one of the entities to define a sub-group from among the members in the group and to distribute a sub-ground message to the members in the sub-group, such that the sub-group message is delivered to all of the sub-ground members in a uniform position with respect to the order of the full-group multicast messages.

The present invention will be more fully understood from the following detailed description of the preferred embodiments thereof, taken together with the drawings in which:

DETAILED DESCRIPTION OF PREFERRED EMBODIMENTS

Figure 1:
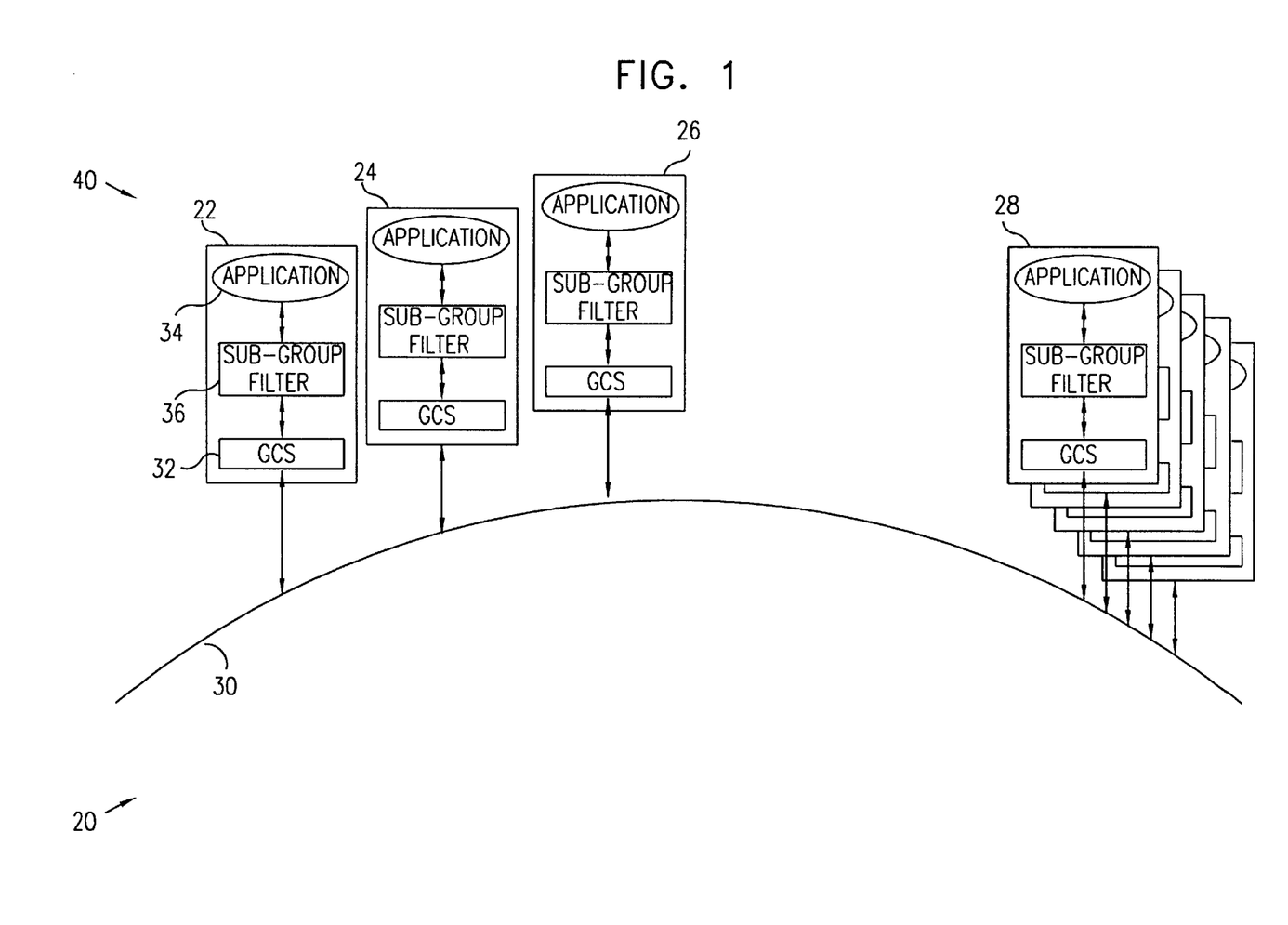
FIG. 1 is a block diagram that schematically illustrates a group of computing nodes linked by a network, in accordance with a preferred embodiment of the present invention.

FIG. 1 is a block diagram that schematically illustrates a distributed computing group 20, comprising a plurality of computing entities, or members 22, 24, 26, 28, . . . , in accordance with a preferred embodiment of the present invention. Typically, each member is associated with a respective computing node in a cluster of nodes linked by a network 30. The nodes preferably comprise IBM AS/400 computers, running the OS/400 operating system, which includes a GCS middleware layer 32. Network 30 preferably comprises a local area network (LAN) or switch fabric, which most preferably operates in accordance with the Internet Protocol (IP). Alternatively, any other suitable types of nodes, network, operating system and GCS that are known in the art of distributed computing may be used.

Each of members 22, 24, 26, 28, ..., runs an instance of a software application 34, such that operations of the application are distributed among the members. GCS 32 provides facilities that support such distributed operation, as is known in the art, including guaranteed distribution of messages among the members and reporting on any membership changes in the group of members running the application. The GCS also ensures that multicast messages are delivered to all of the members in the same order. A sub-group filter layer 36 is used to control distribution of multicast messages that are intended for only a sub-group within group 20, such as a sub-group 40 of members 22, 24 and 26. The operation of layer 36 is described in detail hereinbelow.

Preferably, an application program interface (API) is provided for use by an application programmer in generating messages in group 20 using the GCS and sub-ground filter layer. Optionally, the API comprises different methods for sub-group messaging as opposed to full multicast messaging, in order to save the programmer the trouble of defining sub-group parameters when specifying a full multicast message (i.e., a multicast message directed to all of the members of the group).

Software such as application 34, GCS 32 and filter layer 36, as well as the API for interacting with the GCS and filter layer, is typically distributed to the nodes over network 30. Alternatively, the software may be supplied on tangible media, such as CD-ROM, for installation on the nodes.

Figure 2:
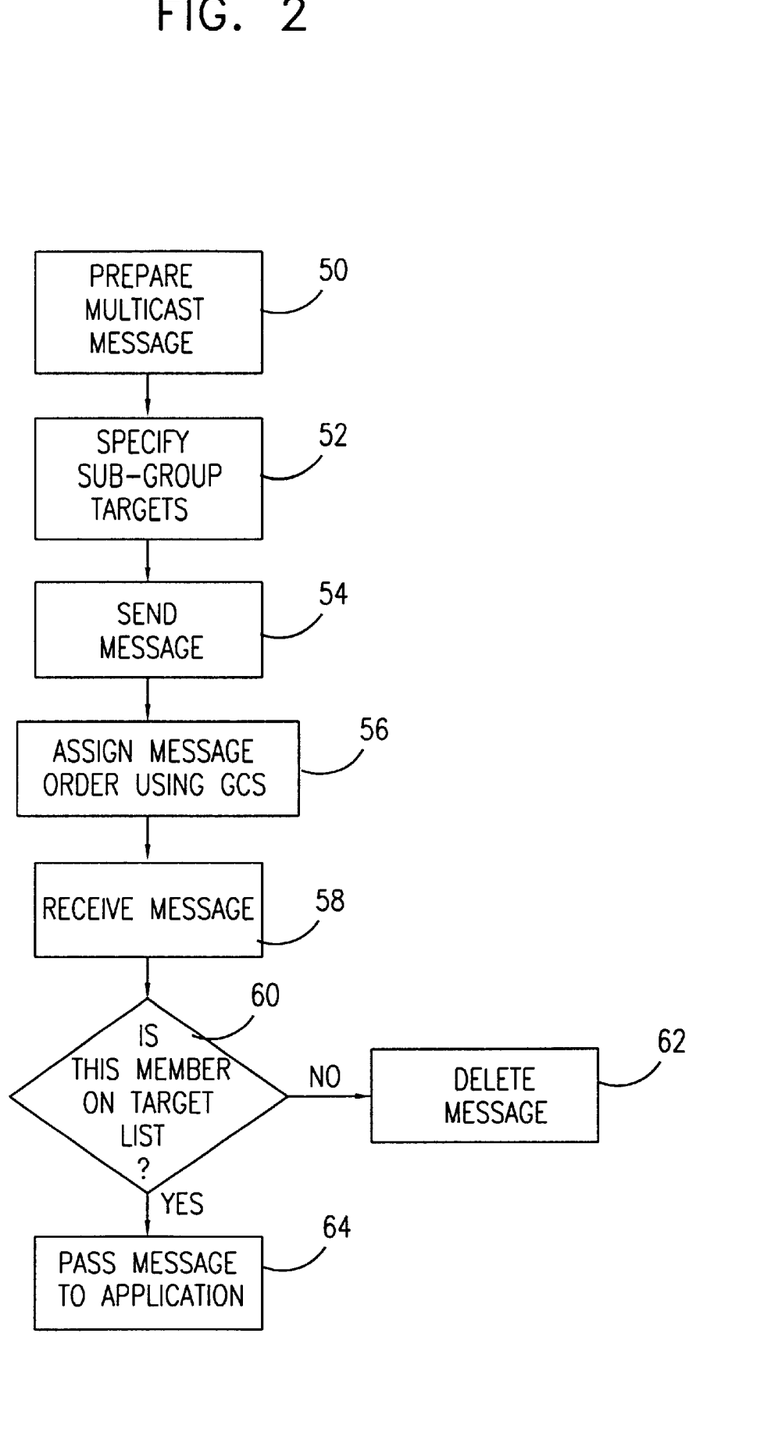
FIG. 2 is a flow chart that schematically illustrates a method for sending and receiving a message within a sub-group of the group of FIG. 1, in accordance with a preferred embodiment of the present invention.

FIG. 2 is a flow chart that schematically illustrates a method for sending and receiving a sub-ground message within group 20, in accordance with a preferred embodiment of the present invention. At a message preparation step 50, application 34 running on one of the members of the group, say member 28, prepares a message to be sent to the members of sub-group 40, i.e., to members 22, 24 and 26. The message has the standard form of a multicast message sent to all of the group members, as is known in the GCS art, except that unlike conventional GCS messages, multicast messages in group 20 also include a target list header field, whose function is described hereinbelow.

At a target specification step 52, application 34 specifies the sub-group to which the multicast message is to be directed, in this case sub-group 40, using sub-ground filter layer 36 of member 28. The sub-group may generally include any of the members of group 20 or, in the case of a full multicast message, all of the members of the group. Layer 36 validates the target specification, verifying that the sub-group is a proper subset of group 20, for example, and inserts the target list information in the message, preferably in a header field. Preferably, in order to reduce the length of the message header, the target list is coded, for example, by hashing or by otherwise assigning a collective sub-group identifier, instead of explicitly listing all of the sub-ground members. Optionally, filter layer 36 may be programmed so that for a multicast message to the entire group 20, the target list field in the message header is simply left empty.

At a send step 54, the sub-group message is passed to GCS layer 32, for distribution to all of the members of group 20. At an order assignment step 56, the GCS multicast protocol assigns the sub-group message a fixed place in the order of multicast messages conveyed in group 20. This order applies uniformly to all multicast messages in the group, regardless of which group members send the messages and which receive them. Filter layer 36 thus enables multicast messages to be handled uniformly by GCS layer 32, whether they are full multicast messages for all group members or sub-group multicast messages. As a result, all of the messages are maintained in their proper order by all group members. The filter layer needed for this purpose can be added to an existing GCS, substantially without change to core GCS functions, and adding only minimal message-handling overhead between GCS layer 32 and application 34.

The sub-group message sent by member 28 is received by all of the members in group 20 at a message reception step 58. GCS layer 32 orders the message for processing according to its assigned multicast message order. At a decision step 60, sub-group filter layer 36 at each member reads the target list in the message header and determines, in each case, whether or not the respective member is included in the target list. For members on the target list, such as members 22, 24 and 26 in sub-group 40, layer 36 passes the message on to application 34 for processing, at a message passing step 64. Otherwise, the message is simply deleted without further processing, at a message deletion step 62.

Figure 3:
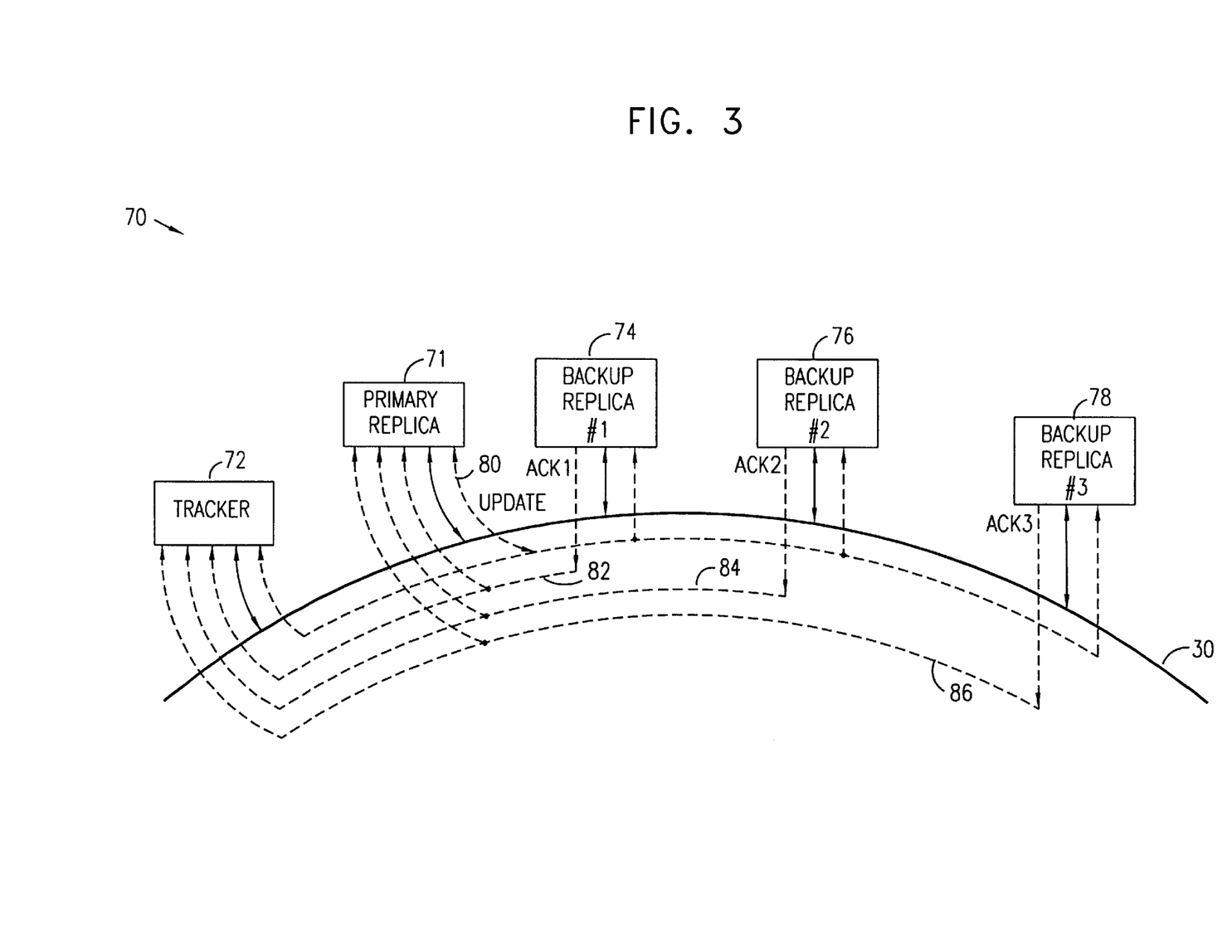
FIG. 3 is a block diagram that schematically illustrates message flow in a group of computer nodes, in accordance with a preferred embodiment of the present invention.

FIG. 3 is a block diagram that schematically illustrates a group 70 of computing entities linked by network 30, illustrating message flow in an application using a GCS with sub-group messaging capability, in accordance with a preferred embodiment of the present invention. In this example, a primary replica of a resource, such as a database, is maintained by a primary member 71, which periodically sends updates, indicated by an arrow 80, to a number of backup replicas maintained by backup members 74, 76 and 78. After primary member 71 sends an update to the backup members, it then must wait for an explicit acknowledgment from each of members 74, 76 and 78, indicated respectively by arrows 82, 84 and 86. An operation tracking member 72 logs the operations of group 70. This is a common scenario in group computing applications.

Updates sent by primary member 71 are full multicast messages, which must be received by all of the members of group 70. On the other hand, the acknowledgments sent by backup members 74, 76 and 78 need to reach only members 71 and 72. Sending the acknowledgments as point-to-point messages from members 74, 76 and 78 to each of members 71 and 72 is possible, but requires each of the backup members to send two acknowledgment messages every time an update is received. Furthermore, it may occur that tracking member 72 will receive the acknowledgment from one of the backup members before receiving the corresponding update from member 71. In this case member 72 will be unable to properly associate the update and the corresponding acknowledgment. These problems could be overcome by having the backup members send their acknowledgments as full multicast messages to all of the members of group 70, as supported by group communication systems known in the art. In this case, however, each of the backup members would also receive all of the acknowledgments sent by the other backup members and would have to waste computing resources in reading and discarding them.

The present invention, on the other hand, allows a sub-group to be specified comprising only members 71 and 72.

The acknowledgment messages sent by backup members 74, 76 and 78 are defined as sub-group messages, with members 71 and 72 as their target list. In this manner, updates and acknowledgments are kept and logged in their proper order with substantially no added overhead at the application level.

Figure 4:
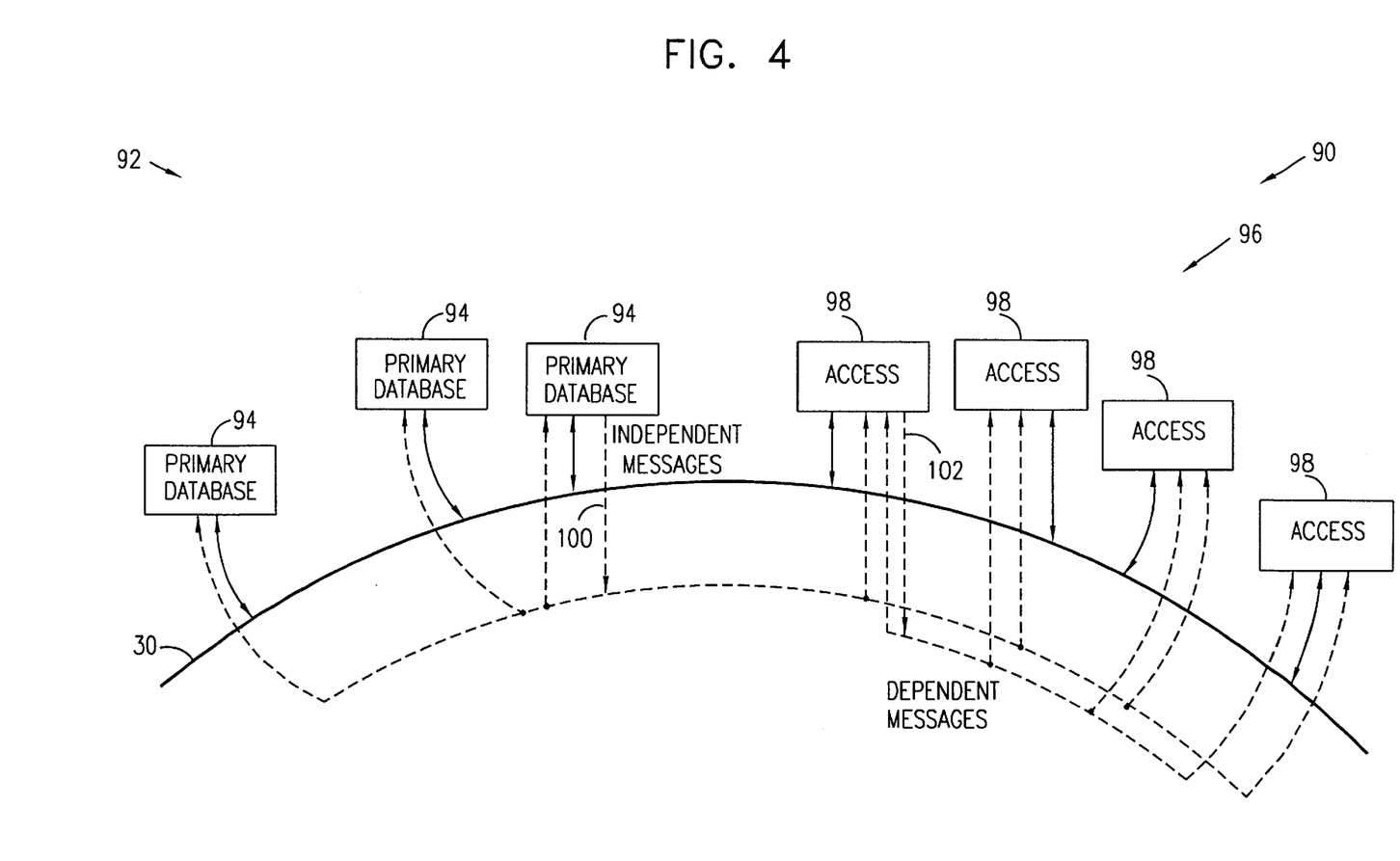
FIG. 4 is a block diagram that schematically illustrates message flow in a group of computer nodes, in accordance with another preferred embodiment of the present invention.

FIG. 4 is a block diagram that schematically illustrates a group 90 of computing entities linked by network 30, illustrating message flow in another application using a GCS with sub-group messaging capability, in accordance with a preferred embodiment of the present invention. In this case, an independent sub-ground 92, comprising primary members 94, maintains a distributed database, as is known in the group computing art. A dependent sub-group 96, comprising access members 98, accesses the database. When a failure occurs in the independent sub-group, such as failure of a network link or of a node associated with one of members 94, all of the members of dependent sub-group 96 must wait to resume database access until independent sub-group 92 has recovered from the failure. (This is the reason for the use of the terms "independent" and "dependent" to describe the two sub-groups.) Only when the independent sub-group has completed handling of the group membership change due to the failure can dependent sub-group 96 resume access to the database (i.e., to sub-group 92). On the other hand, a failure of one of members 98 in the dependent sub-group need have no effect on the independent sub-group.

Dealing with situations of this sort using group communication systems known in the art requires complex event handling and message flow in order to avoid errors and potential deadlocks. One possible solution is to define sub-groups 92 and 96 as separate computing groups, with a specific inter-group dependency, as described, for example, in the above-mentioned U.S. Pat. No. 5,748,958. Such dependency requires that the groups have one or more members in common and must be supported by careful definition of the chain of event handling from one group to the other. These capabilities are not supported by commercially-available group communication systems.

On the other hand, using ordered sub-group messaging, failure of one of primary members 94, as well as other events in group 90, can be handled in a -straightforward manner. Messages sent by members 94 of independent sub-group 92, indicated by an arrow 100, are full multicast messages, and are received by all of the members of group 90. (Although only one of members 94 is shown in the figures as sending a message, any of the members of sub-group 92 can do so.) In this manner, members 98 in sub-group 96 receive notification if a failure occurs in sub-group 92 and, subsequently, of recovery from the failure (as well as of other events that may occur in the independent sub-group). When the recovery notification is received, members 98 can recover and resume access to the database. Dependent messages sent among the members of dependent sub-group 96, indicated by an arrow 102, are received only by the other members of the sub-group and do not disturb the members of independent sub-group 92. Because all of the independent and dependent messages are maintained in a unified order, it is ensured that members 98 will receive and act upon the messages in a consistent manner.

Although preferred embodiments are described hereinabove with reference to group communication systems and the ordered multicast facilities that they normally provide, the principles of the present invention may also be implemented in computing clusters that do not have such capabilities. Such implementations can make use, for example, of multicast capability provided by a network transport protocol layer, such as UDP, which has an interface that allows different multicast groups to be defined. For this purpose, the cluster is preferably divided into multiple subnets (i.e., sub-networks, as are known in the art), each corresponding to a different sub-ground, so that the sub-group messages are sent only to their target recipients within the subnet, and group members do not need to spend resources on filtering out messages that are not addressed to them. In this case, however, explicit steps must be taken to ensure that all of the multicast messages, including messages that are intended for multicast only to a sub-group, are maintained in their proper order.

Figure 5:
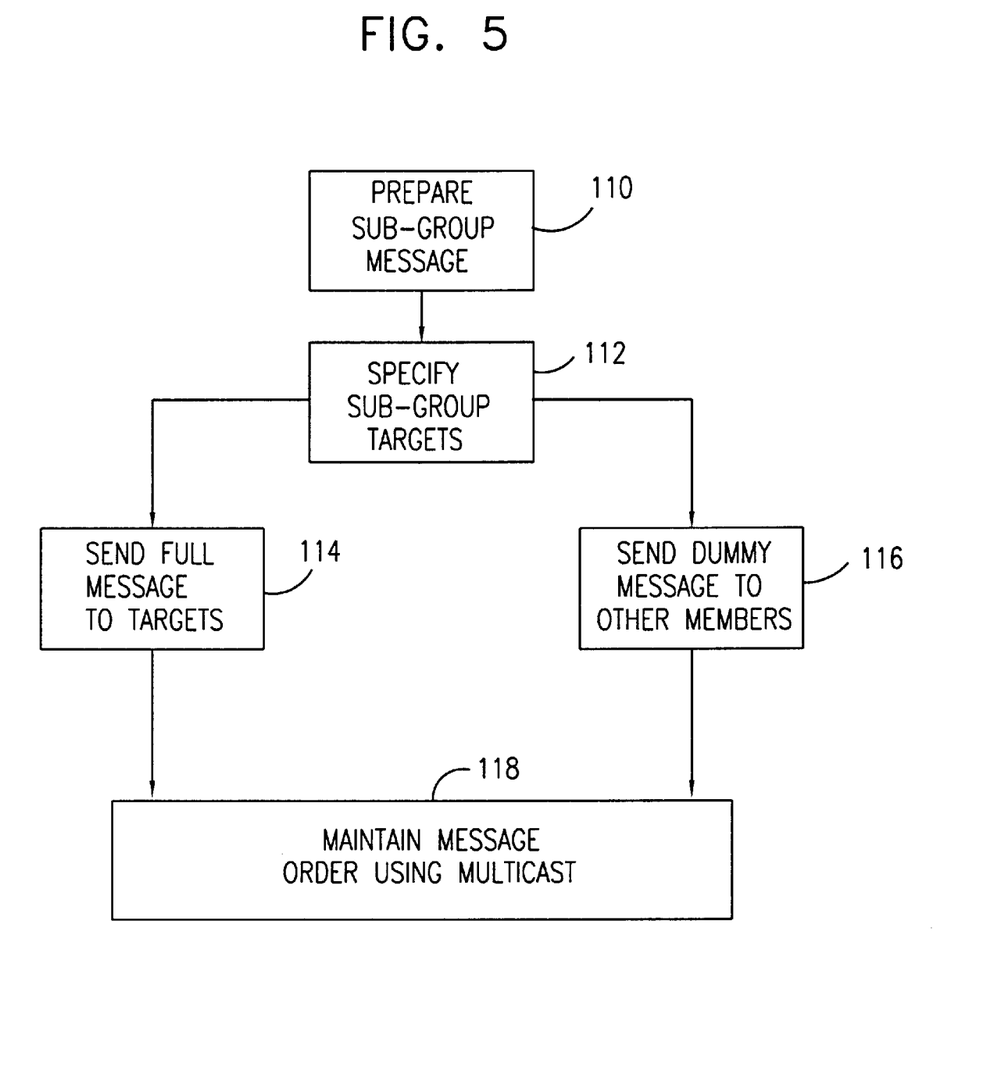
FIG. 5 is a flow chart that schematically illustrates a method for sending a message to a sub-group in a group of computing nodes, in accordance with a preferred embodiment of the present invention.

FIG. 5 is a flow chart that schematically illustrates a method for sending a sub-group message in a computing group, in accordance with a preferred embodiment of the present invention. This method is particularly useful when large sub-group messages must be sent using multicast groups defined by the transport protocol layer, as described in the preceding paragraph. At a message preparation step 110, one of the group members prepares a message to be sent to a given sub-group. At a target specification step 112, the sub-group is identified, typically by a suitable, predefined multicast group identifier associated with the sub-group and, preferably, its corresponding subnet.

At a full message transmission step 114, the message is multicast to the sub-group members in substantially the form in which it was prepared by the sending member. On the other hand, in parallel with step 114, at a dummy transmission step 116, a small, "placeholder" message is multicast to all the other members in the group who do not belong to the identified sub-group. The use of the placeholder message eases traffic on the network linking the group members and reduces the computing burden on non-members of the sub-group. On the other hand, at a message ordering step 118, because all of the group members have received one multicast message (even if not the same message for all members), each of the group members maintains a global, uniform ordering of all of the multicast messages, including both full multicast and sub-group messages.

This method alleviates the need to send sub-group messages to all of the members of the computing group (which must then filter out the messages that are not addressed to them) . Leader-based methods, as are known in the art, may also be used for maintaining message ordering, either in conjunction with the method of FIG. 5 or independent thereof. The leadership may be either distributed or centralized. The leader in such a case sends order messages to the other members, which are used to maintain the message ordering.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for distributing messages among computing nodes, which are mutually-linked in a distributed computing system and which are members in a group that communicate in accordance with a communication protocol that defines full-group multicast messages as messages to be delivered to all of the members in the group, such that any sequence of the full-group multicast messages is delivered to all of the members in the group in an order that is uniform among all of the members, the method comprising:

defining a sub-group from among the members in the group; and distributing a sub-group message to the members in the sub-group, such that the sub-group message is delivered to all of the sub-group members in a uniform position with respect to the order of the full-group multicast messages.

2. A method according to claim 1, wherein the communication protocol is provided by group communication system middleware, to which the members of the group convey the full-group multicast messages to be delivered, and which assigns the uniform order to the full-group multicast messages.

3. A method according to claim 2, wherein distributing the sub-group message comprises adding an identification of the sub-group to a corresponding one of the full-group multicast messages conveyed to the group communication system for delivery to all of the members of the group, and comprising filtering the corresponding full-group multicast message upon delivery to the members responsive to the identification of the sub-group.

4. A method according to claim 3, wherein the sub-group message is included as a full-group multicast message in the uniform order assigned by the group communication system.

5. A method according to claim 3, wherein filtering the corresponding full-group multicast messages comprises, for each of the members, discarding the sub-group message if the member does not belong to the identified sub-group.

6. A method according to claim 3, wherein the group communication system middleware comprises a filter sub-layer added to a group communication protocol layer, which adds the identification of the sub-group to the message when one of the group members sends the sub-group message and which filters the sub-group message upon delivery of the sub-group message to the group members.

7. A method according to claim 6, wherein defining the sub-group comprises receiving a target list of the sub-group members, and wherein adding the identification comprises adding an indication of the target list to a header of the corresponding full-group multicast message.

8. A method according to claim 1, wherein distributing the sub-group message comprises distributing a plurality of sub-group messages, each having a respective, uniform position with respect to the order of the full-group multicast messages and with respect to the other sub-group messages.

9. A method according to claim 8, wherein defining the sub-group comprises defining multiple sub-groups within the group, such that at least some of the different ones of the plurality of sub-group messages are directed to different, respective sub-groups.

10. A method according to claim 1, wherein distributing the sub-group message comprises delivering a full version of the message to the members of the sub-group and delivering a placeholder message to the members that are not in the sub-group so as to maintain the uniform position of the sub-group message with respect to the order of the full-group multicast messages.

11. A method according to claim 1, and comprising assigning one of the group members to be a leader of the group, wherein distributing the sub-group message comprises sending the message to the leader and receiving an order message from the leader, responsive to which the uniform position of the sub-group message is maintained with respect to the order of the full-group multicast messages.

12. Distributed computing apparatus, comprising:

a computer network; and a group of computer nodes, mutually-linked by the network using a communication protocol that defines full-group multicast messages as messages to be delivered to all of the nodes in the group, such that any sequence of the full-group multicast messages is delivered to all of the nodes in the group in an order that is uniform among all of the nodes, wherein the protocol is configured to accept a definition of a sub-group of the nodes and to distribute a sub-group message to the nodes in the sub-ground, such that the sub-group message is delivered to all of the nodes in the sub-group in a uniform position with respect to the order of the full-group multicast messages.

13. Apparatus according to claim 12, wherein the communication protocol comprises group communication system middleware, to which the nodes convey the full-group multicast messages to be delivered, and which assigns the uniform order to the full-group multicast messages.

14. Apparatus according to claim 13, wherein to generate the sub-group message, an identification of the sub-group is added to a corresponding one of the full-group multicast messages conveyed to the group communication system for delivery to all of the nodes in the group, and wherein the protocols filters the full-group multicast messages upon delivery to the members responsive to the identification of the sub-group.

15. Apparatus according to claim 14, wherein the protocol discards the sub-group message if the member does not belong to the identified sub-group.

16. Apparatus according to claim 12, wherein the nodes in the group distribute a plurality of sub-group messages, each having a respective, uniform position with respect to the order of the full-group multicast messages and with respect to the other sub-group messages.

17. Apparatus according to claim 16, wherein the nodes in the group are divided into multiple sub-groups within the group, such that at least some of the different ones of the plurality of sub-group messages are directed to different, respective sub-groups.

18. Apparatus according to claim 12, wherein a subnet of the computer network is defined corresponding to the definition of the sub-group.

19. A computer software product for distributing messages among computing nodes, which are members in a group of mutually-linked nodes in a distributed computing system, the product comprising a computer-readable medium in which computer program instructions are stored, which instructions, when read by the computing nodes, cause the nodes to carry out a communication protocol that defines full-group multicast messages as messages to be delivered to all of the members in the group, such that any sequence of the full-group multicast messages sent by one or more of the member entities is delivered to all of the members in the group in an order that is uniform among all of the members, and further enable an application running on at least one of the entities to define a sub-group from among the members in the group and to distribute a sub-group message to the members in the sub-group, such that the sub-group message is delivered to all of the sub-group members in a uniform position with respect to the order of the full-group multicast messages.

20. A product according to claim 19, wherein the product comprises group communication system middleware, which causes the members to run the communication protocol, and which assigns the uniform order to the full-group multicast messages.

21. A product according to claim 20, wherein the sub-ground message is included as a full-group multicast message in the uniform order assigned by the group communication system.

22. A product according to claim 20, wherein the communication protocol comprises a filter sub-layer added to a group communication protocol layer of the group communication system, which adds the identification of the sub-group to the message when one of the members sends the sub-group message and which filters the sub-group message upon delivery of the sub-group message to the other members.

23. A method for distributing messages among computing processes, which are mutually-linked in a distributed computing system and which are members in a group that communicate in accordance with a communication protocol that defines full-group multicast messages as messages to be delivered to all of the members in the group, such that any sequence of the full-group multicast messages is delivered to all of the members in the group in an order that is uniform among all of the members, the method comprising:

defining a sub-group from among the members in the group; and distributing a sub-group message to the members in the sub-group, such that the sub-group message is delivered to all of the sub-group members in a uniform position with respect to the order of the full-group multicast messages.

* * * * *